US008187753B2

(12) United States Patent
Wixom et al.

(10) Patent No.: US 8,187,753 B2
(45) Date of Patent: *May 29, 2012

(54) ELECTRODE MATERIAL WITH ENHANCED IONIC TRANSPORT PROPERTIES

(75) Inventors: Michael Wixom, Ann Arbor, MI (US); Chuanjing Xu, Ann Arbor, MI (US)

(73) Assignee: A123 Systems, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,091

(22) Filed: Nov. 29, 2010

(65) Prior Publication Data

US 2011/0068298 A1    Mar. 24, 2011

Related U.S. Application Data

(63) Continuation of application No. 11/345,962, filed on Feb. 2, 2006, now Pat. No. 7,842,420.

(60) Provisional application No. 60/649,501, filed on Feb. 3, 2005.

(51) Int. Cl.
*H01M 4/58* (2010.01)

(52) U.S. Cl. ............... 429/231.95; 429/231.5; 429/221; 429/209

(58) Field of Classification Search ............. 429/231.95, 429/231.5, 221, 209
See application file for complete search history.

(56) References Cited

U.S. PATENT DOCUMENTS

| | | | |
|---|---|---|---|
| 5,910,382 A | 6/1999 | Goodenough et al. | |
| 6,528,003 B1 | 3/2003 | Sano et al. | |
| 6,599,662 B1 | 7/2003 | Chiang et al. | |
| 6,656,635 B2 | 12/2003 | Okawa et al. | |
| 6,723,470 B2 | 4/2004 | Barker et al. | |
| 6,730,281 B2 | 5/2004 | Barker | |
| 6,787,232 B1 | 9/2004 | Chiang et al. | |
| 6,815,122 B2 | 11/2004 | Barker et al. | |
| 6,855,273 B2 | 2/2005 | Ravet et al. | |
| 6,884,544 B2 | 4/2005 | Barker et al. | |
| 7,001,690 B2 | 2/2006 | Barker et al. | |
| 7,842,420 B2 | 11/2010 | Wixom et al. | |
| 2004/0005265 A1 | 1/2004 | Chiang et al. | |
| 2004/0018430 A1 | 1/2004 | Holman et al. | |

(Continued)

FOREIGN PATENT DOCUMENTS

| JP | 2003292309 A | 10/2003 |
|---|---|---|
| JP | 2004359538 A | 12/2004 |

OTHER PUBLICATIONS

Striebel et al,, "Comparison of LiFePO4 from Different Sources", Journal of the Electrochemical Society, 152(4) A664-A670 (2005).

(Continued)

*Primary Examiner* — Jane Rhee
(74) *Attorney, Agent, or Firm* — Wilmer Cutler Pickering Hale and Dorr LLP

(57) ABSTRACT

Materials useful as electrodes for lithium batteries have very good electronic and ionic conductivities. They are fabricated from a starting mixture which includes a metal, a phosphate ion, and an additive which enhances the transport of lithium ions in the resultant material. The mixture is heated in a reducing environment to produce the material. The additive may comprise a pentavalent metal or a carbon. In certain embodiments the material is a two-phase material. Also disclosed are electrodes which incorporate the materials and lithium batteries which incorporate those electrodes.

30 Claims, 1 Drawing Sheet

U.S. PATENT DOCUMENTS

| | | |
|---|---|---|
| 2004/0033360 A1 | 2/2004 | Armand et al. |
| 2004/0086445 A1 | 5/2004 | Armand et al. |
| 2004/0175614 A1 | 9/2004 | Wurm |
| 2005/0186476 A1 | 8/2005 | Barker et al. |
| 2006/0127767 A1* | 6/2006 | Gauthier et al. ............. 429/221 |
| 2008/0138709 A1 | 6/2008 | Hatta et al. |

OTHER PUBLICATIONS

Wang et al., "Improving the rate performance of LiFePO4 by Fe-site doping", Electrochimica Acta. vol. 50, No. 14, pp. 2955-2958, May 5, 2005.

Yonemura et al., "Comparative Kinetic Study of Olivine LixMPO4 (M=Fe, Mn)", Journal of Electrochemical Society 151 (9), A1352-A1356 (2004).

Non-Final Office Action issued in U.S. Appl. No. 11/345,962, dated Nov. 12, 2009 (8 pages).

Non-Final Office Action issued in U.S. Appl. No. 11/345,962, dated Apr. 12, 2009 (9 pages).

Non-Final Office Action issued in U.S. Appl. No. 11/345,962, dated Oct. 27, 2008 (9 pages).

* cited by examiner

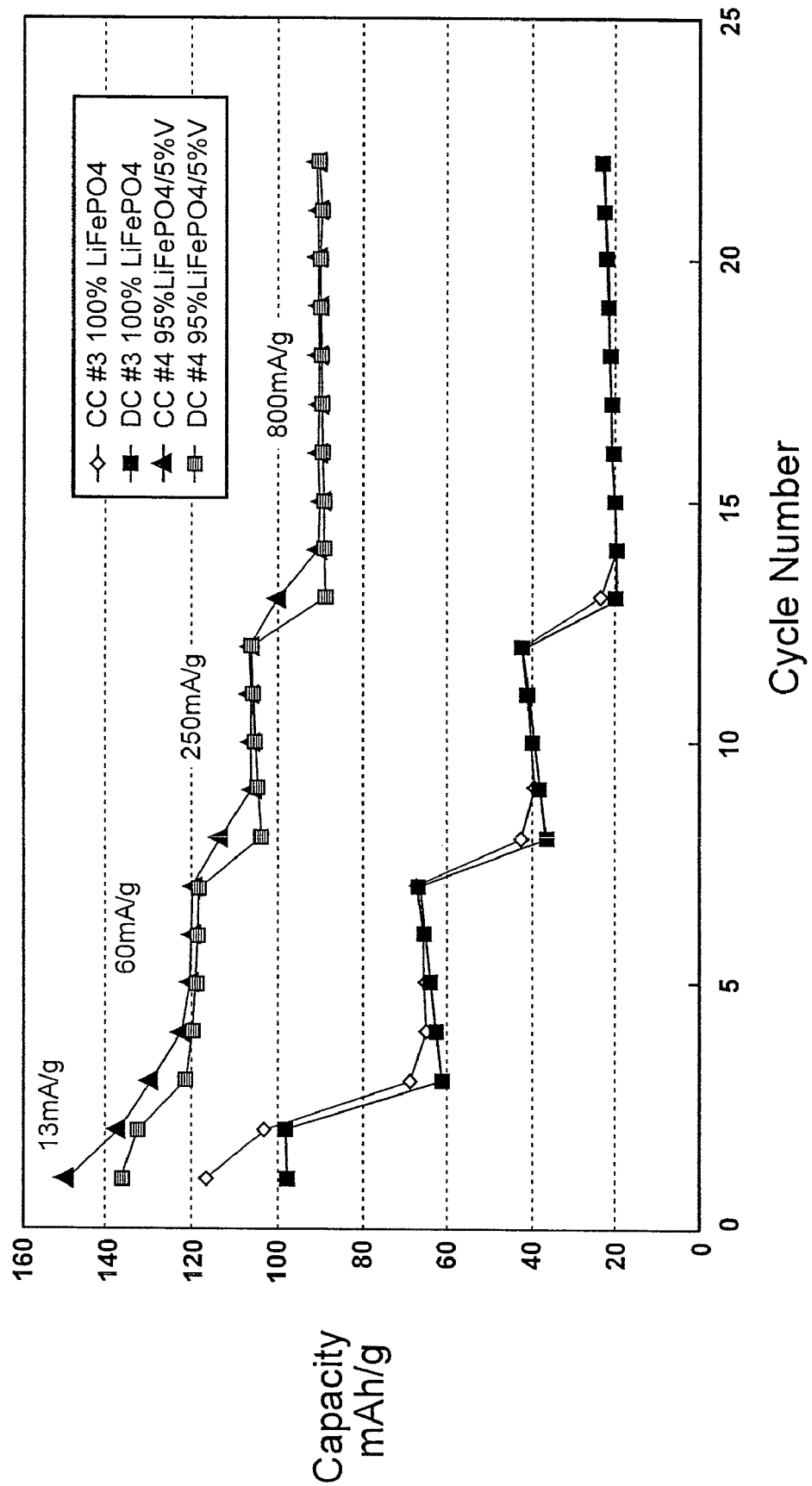

ELECTRODE MATERIAL WITH ENHANCED IONIC TRANSPORT PROPERTIES

RELATED APPLICATION

This application is a continuation of U.S. patent application Ser. No. 11/345,962 now U.S. Pat. No. 7,842,420 filed Feb. 2, 2006 entitled "Electrode Material With Enhanced Ionic Transport Properties", which claimed prior to U.S. Provisional Application Ser. No. 60/649,501 filed Feb. 3, 2005.

FIELD OF THE INVENTION

This invention relates generally to materials and to methods for synthesizing these materials. More specifically, the invention relates to methods for synthesizing particular materials which include a metal phosphate phase. Most specifically, the invention relates to a method for synthesizing a metal phosphate material which has an enhanced conductivity for lithium ions, as well as to such materials, and to electrodes and other devices made from such materials.

BACKGROUND OF THE INVENTION

Lithiated transition metal phosphates such as $LiFePO_4$, including various doped and modified versions thereof, are finding growing utility as cathode materials for lithium batteries. In operation, these materials transport electrons and lithium ions there through. Lithium transport through such materials is a significant factor influencing their performance in lithium battery systems. Hence the efficiency of devices which incorporate such materials is dependent on their lithium ion transport properties among other things. For this reason, the art has sought to increase the lithium transport in such materials.

As will be explained herein below, the present invention provides an electronic material based upon lithiated metal phosphates which material combines good electronic conductivity with high ionic conductivity. In certain embodiments of the invention, the materials are composites of at least two phases. The materials of the present invention are simple and economical to synthesize, and are ideal cathodes for lithium batteries with high power capabilities.

BRIEF DESCRIPTION OF THE INVENTION

Disclosed herein is a method for synthesizing a material having utility as an electrode for a lithium battery. The method comprises providing a starting mixture which includes lithium, a metal, a phosphate ion and an additive which enhances the transport of lithium ions in a material prepared by this method, as compared to a material prepared in the absence of the additive. The mixture is heated in a reducing environment so as to produce a material which comprises $Li_xMPO_4$ wherein M is said metal, and x ranges from 1 upwards to approximately 1. In some specific instances x may have values as high as 1.05, it being understood that such superstoichiometric values are within the definition of "approximately 1" for purposes of this disclosure. In particular instances, the additive is selected from the group consisting of: V, Nb, Mo, C, and combinations thereof. In some instances, the additive promotes the reduction of the phosphate ion. In other instances, the additive promotes the reduction of a carbon-containing species so as to generate free carbon. In other instances, the additive substitutes for a portion of the metal in the material. In other instances, it may substitute for a portion of the phosphorus.

In yet other instances, the additive may function as a nucleating agent which promotes the growth of at least one component of the material. In still other instances, the additive may promote the reduction of a carbon-containing species in the starting mixture so as to generate free carbon, and this free carbon may be at least partially $sp^2$ bonded. In yet other instances, the additive is operative to modify the lattice structure of the material so that the transport of lithium ions through the modified lattice is enhanced in relation to the transport of lithium ions through a corresponding unmodified lattice.

In some instances, the material is a two-phase material which includes a first phase comprised of the $Li_xMPO_4$ and a second phase. The ionic conductivity of the second phase may be higher than that of the first phase. In specific instances, the second phase includes oxygen and the atomic ratio of oxygen to phosphorus is less than 4:1. In certain embodiments, the first phase comprises 80-95 mole percent of the composite material and the second comprises 5-20 mole percent.

In some instances the metal M is initially present in the starting mixture in a first oxidation state, and when the mixture is heated in a reducing environment at least a portion of the metal is reduced from the first oxidation state to a second oxidation state which is lower than the first oxidation state. In some instances, the reducing environment may comprise a gaseous reducing environment, which in other instances, the reducing environment may be provided by the inclusion of a solid or liquid reducing agent. Heating may be carried out in a temperature range of 300-750° C., and in particular instances, at a temperature in the range of 650-700° C.

Also disclosed herein are materials made by the process of the present invention. In one instance, the materials of the present invention are characterized in that when they are incorporated into a cathode of a lithium battery, the lithium ion conductivity of the material is in the range of $10^{-6}$ S/cm to $5 \times 10^{-4}$ S/cm. The material may be further characterized in that when incorporated into a cathode of a lithium ion battery, its electronic conductivity is in the range of $10^{-7}$ S/cm to $10^{-4}$ S/cm. Also disclosed herein are electrodes made from the materials of the present invention as well as lithium batteries which incorporate those electrodes.

BRIEF DESCRIPTION OF THE DRAWING

FIG. 1 is a graph showing the rate capability of materials of the present invention and comparative materials, in terms of capacity versus charge/discharge cycle numbers

DETAILED DESCRIPTION OF THE INVENTION

Prior art methods for synthesizing lithiated metal phosphate materials generally rely upon a chemical reaction of precursor materials which is typically carried out at elevated temperatures. In accord with the present invention, the inventors thereof have synthesized lithiated metal phosphate compounds by reacting precursor materials under reducing conditions, typically wherein the metal component thereof is reduced from a higher to a lower oxidation state; and in so doing, the inventors have found that the thus-produced material has significantly improved performance characteristics as a cathode material for lithium batteries, as compared to prior art materials. In particular instances, the metal and the phosphate are both present in one component of the starting mixture. For example, when the metal is iron, the starting mixture may include $FePO_4$, wherein the iron is present in the +3 state. As the synthesis reaction proceeds, the iron is reduced to the +2 state. Materials produced by this process manifest good electronic and ionic conductivities and it is believed that this is in part attributable to the fact that the metal and the phosphate ion are initially in close proximity in the starting mixture. Having the iron and phosphorus in close proximity reduces processing time and temperature since less solid state diffusion is required.

According to the method of the present invention, the starting mixture includes an additive which enhances the lithium ion conductivity of the thus-produced material, as compared to materials prepared identically, but in the absence of the additive. The additive may comprise one or more metals having a +5 oxidation state. And, in particular instances, the metal does not have a +6 oxidation state. Vanadium is one specifically preferred additive metal; niobium is another. In some instances, carbon acts as an additive, and this carbon may be derived from a source, such as a polymer or other organic compound which is reduced during the preparation of the material. In particular instances one additive, such as the aforementioned metal, may enhance or cause the activity of another additive such as carbon. As will be detailed below, the additive may operate in various modes so as to enhance the ionic conductivity of the material; and in some instances, it may also act to enhance the electronic conductivity of the material.

Upon investigation, the inventors have found that in particular instances, the reductive, synthetic method of the present invention produces a two-phase material. This material was analyzed via electron microscopy and EDX, and it has been found that the thus-produced material includes a first phase which comprises a lithiated metal phosphate having very good ionic conductivity, and a second phase which has an electronic conductivity greater than that of the first phase. In some instances the second phase is a species that includes at least the metal and phosphorus, and may also include subphosphate levels of oxygen. In certain instances, the second phase also has good ionic conductivity. In a particular material, the first phase is of the general formula $Li_xMPO_4$ wherein M is a metal such as iron, and x is less than or equal to approximately 1; and a second phase which is the reduced form of a metal phosphate. For example, when the metal is iron, the second phase includes one or more of: $Fe_2P_2O_7$; FeP; $Fe_2P$ and $Fe_3P$.

As noted above, inclusion of relatively small amounts of an additive enhances the performance of the resulting cathode material, presumably by enhancing the lithium ion transport properties of the material. This effect may be manifest as an increase in the ionic conductivity of the bulk material, and/or as an enhancement of ion transport between particles of the bulk material. The additive may be incorporated as an additional component of the material as a dopant, modifier or the like, and in such instance, the general formula for the material given above is understood to also represent materials of the general formula $Li_xM_{1-y}A_yPO_4$ where A is the additive, y is less than 1, and M and x are as described above. In other instances, the additive may not be directly incorporated into the material, and may function as a catalyst or other species which modifies the physical and/or chemical environment of the material. Among the additives which may be so employed is vanadium, typically included in the starting mixture in the form of $V_2O_5$. Niobium and its compounds may be similarly employed. Other additives include: other metals, such as molybdenum, and carbon. The additive may directly influence the lithium ion conductivity of the material; or it may act as a flux which enhances the dispersion of lithium. The additive may also enhance formation of another species such as carbon, a metal, or the like, and this species can then function as an additive so as to enhance the performance of the resultant cathode material, either directly or by promoting the formation of a phase or species having high lithium capacity. For example, carbon may be generated by the reduction of organic molecules present in the reaction mixture, and this carbon can act as a direct conductivity enhancer and/or as an additive which enhances the material, and the additive may influence the amount and/or nature of the carbon. Also, the additive may function as a nucleating agent which fosters growth of a preferred phase or species. In other instances, the additive will facilitate the formation of surface states on particles of the material, which states facilitate inter-particle ion transport.

The additive may play various other roles in the material. It may function as a catalyst which promotes the reduction of phosphate or other species in the resultant material as discussed above. In other instances, the additive may function as a dopant. For example, an additive such as vanadium may substitute for some portion of the phosphorous in the material, and in that regard, it may enhance the ionic conductivity of the material. The additive may also substitute for some portion of the Fe in the olivine structure, and may thus enhance ionic transport in the material through effects such as vacancy hopping, modification of local electron density, formation of larger tunnels or the like. The additive may also act to modify the lattice structure of the material, either by doping or by steric and/or electronic effects; and this modified lattice can have an improved ionic conductivity. As such, the additive may have diverse and overlapping functions, and may act as a dopant and/or a catalyst for the formation of such beneficial structures. Therefore, the role of the additive in enhancing the lithium ion capacity and transport is to be interpreted broadly.

In accord with yet another aspect of the present invention, the methods hereof provide for the preparation of a material which includes carbon wherein the electronic state, morphology and/or disposition of the carbon in the material is optimized so as to provide a cathode material having enhanced electronic and ionic transport properties. Carbon is known to have good electrical conductivity; the presence of even relatively small amounts of carbon can enhance the electrical conductivity of materials of the type used in the practice of the present invention. It has been found that the electronic and lithium ion transport properties of $sp^2$ coordinated carbon are better with regard to the materials of the present invention than are the corresponding properties of $sp^3$ coordinated carbon. While not wishing to be bound by speculation, it is believed that use of the methods of the present invention provides a material having an increased concentration of $sp^2$ carbon, as compared to other processes in the prior art. For example, presence of the additive and/or the reduction step increases the amount of preferred $sp^2$ carbon and/or improves its distribution. As a result, higher ionic and electronic conductivities are achieved.

In addition, the methods of the present invention optimize the particle size, shape and/or distribution of the carbon so as to maximize its effect while minimizing any inhibition of ionic transport. The in situ generation of carbon from an intimately mixed mixture of reactive precursors facilitates the distribution of very small particles and/or thin films of carbon on or between particles of ionically active material. These small-dimensioned bodies of carbon establish good electrical contact between ionically active particles while minimizing any impediment to ion transport there between.

Therefore, in accord with this particular aspect of the present invention, it has been found that steps of the present invention including one or more of incorporation of an additive, milling and mixing, and reaction under reducing conditions serves to optimize the electronic and physical properties of carbon which may be included in the materials of the present invention. In this manner, both electronic conductivity and ionic storage and transport properties of the materials of the present invention are optimized with regard to their use as electrochemical materials, and in particular cathode materials for lithium batteries.

In one group of embodiments of the two-phase material of the present invention, the first phase comprises approximately 80-95 mole percent of the composite material and the second phase comprises 5-20 mole percent of the composite material. In a particular group of materials, the first phase comprises 85-90 mole percent of the material and the second phase comprises 10-15 mole percent of the material. Typical concentrations of the additive material in the resultant composite material are generally fairly low, and typically fall in the range of 0.1-5 atomic percent of the total material. EDX analysis suggests that concentrations of metals such as vanadium, or other residual additives are somewhat higher in or near the interface with the second phase which confirms that the additive material is active in the formation of the second phase. It is possible, also, that the additive can act as a nucleation point for the growth of the second phase.

In a typical process for the synthesis of a material of the present invention, a starting mixture which includes lithium, a metal such as iron, a source of phosphate ion and the additive is prepared. This mixture is typically blended by grinding such as in a ball mill, attritor mill, mortar or the like, and this resultant mixture is heated in a reducing environment. In some instances the grinding process may introduce organic compounds into the reaction mixture, as for example from solvents or from the vessel in which milling takes place. Carbon derived from this source can have a beneficial effect on the formation of the material of the present invention. In other instances carbon-containing compounds may be specifically introduced into the mixture prior to reaction. One such carbon source is polyvinyl alcohol (PVA). A typical reducing environment may comprise a gaseous atmosphere including one or more of hydrogen, ammonia, hydrocarbons and carbon monoxide; and in general, equal results are obtained utilizing either gas. In other instances, the reducing environment may be created by including solid or liquid reductants in the mixture.

In one group of syntheses, the source of lithium is a lithium salt such as lithium carbonate. The iron and phosphate ions may both be provided by utilizing a material such as ferric phosphate, which is subsequently reduced to a ferrous compound. As noted above, vanadium is one particular additive material, and may be utilized in the form of $V_2O_5$. As also noted above, carbon, particularly carbon generated during the reductive synthesis, can have a beneficial effect on the formation of the materials of the present invention. Hence, small amounts of organic material may be added to the reaction mixture, either directly or as artifacts of the preparation process. This reaction mixture is heated, at atmospheric pressure, under a reducing atmosphere as noted above, to a temperature of approximately 550-600° C. for 1.5-2.0 hours. Following the reduction, the material is cooled to room temperature, typically under an inert atmosphere. Material thus produced demonstrates excellent performance characteristics when incorporated into cathodes for lithium batteries.

In one specific procedure, a first material was prepared from a starting mixture comprising: $Li_2CO_3$, 0.02 M (1.4780 g) and $FePO_4 \times 2H_2O$, 0.04 M (7.0031 g with Fe content of 31.9%). A second material was prepared from a mixture comprising: $Li_2CO_3$, 0.02 M (1.4780 g); $FePO_4 \times 2H_2O$, 0.95×0.04 M (6.6530 g with Fe content of 31.9%) and $V_2O_5$, 0.05×0.02 M (0.1819 g). The mixtures were each ball milled for 96 hours in acetone with 2 mm and 5 mm YSZ balls. The acetone slurry was discharged from the bottle and dried in air. The powders were then ground with a mortar and pestle and transferred to quartz boats for a temperature programmed reduction reaction.

In the reaction, the mixtures were heated under a hydrogen atmosphere, at a flow rate of 1.26/min., according to the following schedule: RT→350° C., 2 hrs.; 350° C.→350° C., 2 hrs.; 350° C.→600° C., 3 hrs.; 600° C.→600° C., 1.5 hrs. Thereafter, the samples were cooled to 100° C. and passivated in an $O_2$/He atmosphere.

In the vanadium-free sample, particles ranged in size from 50 nm to several microns, and the micron sized particles had nanometer sized features. EDX analysis of two 200 nm sized particles showed an atomic percent ratio of Fe:P:O of 29.4:28:42.6 and 25.8:28.5:45.7, indicating the presence of phosphate and partially reduced phosphate. EDX analysis of a micron sized whisker structure showed an atomic percent ratio for Fe:P:O of 49.1:48.9:2.0 indicating the presence of FeP. EDX of one spot on a micron sized whisker showed Na peaks with an atomic percent of 11.6. All other EDX on different spots showed an Fe:P ratio of around 1 with an atomic percent of O of 1.6 to 49.5 indicating the presence of phosphate, partially reduced phosphate and FeP, but there was no indication of $Fe_2P$ or $Fe_3P$.

Similar analyses of the V containing material showed particle sizes ranging from 50 nm to several microns with nanometer sized features on the micron sized particles. EDX of one 150 nm particle showed Fe:P:O:V atomic percent ratios of 2.68:25.1:47.2:1.0 indicating the presence of phosphate and partially reduced phosphate. EDX of a 30 nm particle showed a Fe:P:O:V atomic percent ratio of 59.4:33.9:3.9:2.9 indicating the formation of $Fe_2P$ with the presence of V. EDX of a 150 nm long whisker showed a Fe:P:O:V atomic percent ratio of 68.8:30.5:0.6:0.1 indicating the formation of $Fe_2P$ and $Fe_3P$ without the presence of V. EDX of three different sized whiskers showed the presence of $Fe_2P$. EDX of round particles showed no difference in phosphate formation in the bulk and at edges. The x-ray diffraction pattern of $LiFePO_4$ indicates the olivine crystal structure.

Electronic and ionic conductivities were measured for a series of materials prepared in accord with the present invention as well as for a comparative series of materials. Table 1 hereinbelow sets forth representative measurements of these properties. Sample 1 in the table comprises a lithium iron phosphate material which did not include any additive of the present invention, and which was prepared in accord with prior art non-reductive synthetic procedures. Conductivity was measured using probe impedance spectroscopy on dry pellets of the materials, although other methods of measuring conductivity such as a galvanostatic intermittent titration method (GIPT) could be employed. Sample 2 comprises a lithium iron phosphate material which further includes vanadium but which was prepared utilizing a non-reductive process as per sample 1. Sample 3 is a lithium iron phosphate material which does not include any vanadium additive but which was prepared utilizing a reductive synthesis in accord with the present invention, and as such the material of sample 3 corresponds to the first synthesized material described above. Sample 4 corresponds to the second synthesized material described above and as such includes vanadium and has been prepared utilizing a reductive synthesis. Sample 5 is representative of a commercially available high rate capacity material comprising lithium cobalt oxide.

TABLE 1

| Sample No. | Sample Content | Precursors | Electronic Conductivity (S/cm) | Ionic Conductivity (S/cm) |
|---|---|---|---|---|
| 1 | LiFePO$_4$ without V | Fe (II) | <7 × 10$^{-7}$ | 7 × 10$^{-5}$ |
| 2 | LiFePO$_4$ with V | Fe (II) | 4 × 10$^{-9}$ | 5 × 10$^{-5}$ |
| 3 | LiFePO$_4$ without V | Fe (III) | 7 × 10$^{-3}$ | <7 × 10$^{-5}$ |
| 4 | LiFePO$_4$ with V | Fe (III) | 1 × 10$^{-4}$ | 5 × 10$^{-4}$ |
| 5 | LiCoO$_2$ | from FMC | 5.4 × 10$^{-4}$ | 1 × 10$^{-4}$ |

Samples 3 and 4 of the foregoing table were fabricated into electrodes and incorporated into half cells and evaluated in terms of their rate capability. The electrolyte utilized was 1 M LiPF$_6$ in 1:1 EC/DEC. The half cells were cycled at current densities of 13 mA/g, 60 mA/g, 250 mA/g and 800 mA/g for two, five, five and ten cycles. The results of this evaluation are summarized in graphic form in FIG. 1. Sample 3 and sample 4 have similar electronic conductivities, while the ionic conductivity of sample 4 is seven times higher than that of sample 3. As will be seen from the FIGURE, charge capacity of sample 3 is relatively low compared to that of sample 4, even though its electronic conductivity is slightly better. This is particularly notable at high current densities. The charge capacity of sample 4 is significantly improved, and this is attributable not only to its good electronic conductivity but also to its improved ionic conductivity.

From the foregoing, it will be seen that the principles of the present invention provide for materials having significantly improved lithium ion conductivities. These materials can be utilized to fabricate electrodes for lithium and lithium-ion batteries which batteries will manifest very good rate capabilities.

The foregoing description has primarily been directed to iron-containing materials; however, it is to be understood that composite materials based upon other metals may likewise be fabricated in accord with the principles of the present invention. While the foregoing has generally described two-phase materials, the present invention may be employed to prepare single phase materials as well as materials comprising more than two phases. Also, the material of the present invention has been described with primary reference to its use as a cathode material for lithium batteries. It is to be understood that this material, owing to its good electronic and ionic properties, will also have utility in other electrochemical applications, such as chemical reactors, other battery systems, electronic devices and the like. Also, the material of the present invention will have utility in various catalytic applications both as an electrocatalyst and a non-electrocatalyst. Accordingly, it is to be understood that the foregoing description and discussion is illustrative of specific embodiments of the invention, but is not meant to be a limitation upon the practice thereof. It is the following claims, including all equivalents, which define the scope of the invention.

What is claimed is:

1. An electroactive material comprising:
a first phase comprising a lithiated olivine metal phosphate comprising a first metal M;
a second phase having an ionic conductivity greater than the ionic conductivity of the first phase; and
an additive in at least one of the first and second phases, the additive comprising a metal different from the first metal;
characterized in that when incorporated into a cathode of a lithium battery, the electroactive material has a lithium ion conductivity in the range of 10$^{-6}$ S/cm to 5×10$^{-4}$ S/cm.

2. The material of claim 1, wherein the additive is in the second phase.

3. The material of claim 2, wherein the additive comprises a metal having a +5 oxidation state, but not a +6 oxidation state.

4. The material of claim 2, wherein the additive comprises one or more of V, Mo, and Nb.

5. The material of claim 4, wherein the additive is V.

6. The material of claim 1, wherein the additive is in the first phase.

7. The material of claim 6, wherein the additive comprises a metal having a +5 oxidation state, but not a +6 oxidation state.

8. The material of claim 6, wherein the additive comprises one or more metals selected from the group consisting of V, Mo, and Nb.

9. The material of claim 8, wherein the additive is V.

10. The material of claim 8, wherein the additive comprises V and Nb or the additive comprises Mo and Nb.

11. The material of claim 6, wherein the additive substitutes for at least a portion of the phosphorous in the material.

12. The material of claim 6, wherein the additive substitutes for a portion of the metal M in the material.

13. The material of claim 1, characterized in that when incorporated into a cathode of a lithium ion battery, the electronic conductivity of the material is in the range of 10$^{-7}$ S/cm to 10$^{-4}$ S/cm.

14. The material of claim 1, wherein the metal M is iron.

15. The material of claim 1, wherein the second phase includes one or more phosphates, partially reduced phosphate and phosphides.

16. The material of claim 1, wherein the second phase includes one or more of Fe$_2$P$_2$O$_7$; FeP; Fe$_2$P; Fe$_3$P.

17. The material of claim 1, wherein the first phase comprises 80-95 mole percent of the material and the second phase comprises 5-20 mole percent of the material.

18. An electrode which includes the material of claim 1.

19. An electroactive material comprising:
a lithiated olivine metal phosphate comprising a metal M; and
V and Nb, wherein the material comprises a first phase comprising the lithiated olivine metal phosphate and a second phase having an ionic conductivity greater than the ionic conductivity of the first phase; and when incorporated into a cathode of a lithium battery, the electroactive material has a lithium ion conductivity in the range of 10$^{-6}$ S/cm to 5×10$^{-4}$ S/cm.

20. The material of claim 19 wherein the metal M comprises Fe.

21. The material of claim 19, wherein the second phase includes one or more phosphates, partially reduced phosphates and phosphides.

22. The material of claim 19, wherein the second phase comprises one Or more of Fe$_2$P$_2$O$_7$; FeP; Fe$_2$P; Fe$_3$P.

23. The material of claim 19, wherein the first phase comprises 80-95 mole percent of the material and the second phase comprises 5-20 mole percent of the material.

24. The material of claim 19, wherein V is a dopant.

25. The material of claim 19, wherein Nb is a dopant.

26. The material of claim 19, wherein V substitutes for at least a portion of the phosphorous in the material.

27. The material of claim 19, wherein V substitutes for a portion of the metal M in the material.

28. The material of claim 19, wherein Nb substitutes for at least a portion of the metal M in the material.

29. The material of claim 19, wherein Nb substitutes for at least a portion of the phosphorous in the material.

30. An electrode which includes the material of claim 19.

* * * * *